US010595125B2

(12) United States Patent
Takayama

(10) Patent No.: US 10,595,125 B2
(45) Date of Patent: Mar. 17, 2020

(54) AUDIO PROCESSING SYSTEM, AUDIO PROCESSING DEVICE, AND AUDIO PROCESSING METHOD

(71) Applicant: PANASONIC INTELLECTUAL PROPERTY MANAGEMENT CO., LTD., Osaka (JP)

(72) Inventor: Shinichi Takayama, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/097,935

(22) PCT Filed: Apr. 19, 2017

(86) PCT No.: PCT/JP2017/015639
§ 371 (c)(1),
(2) Date: Oct. 31, 2018

(87) PCT Pub. No.: WO2017/203900
PCT Pub. Date: Nov. 30, 2017

(65) Prior Publication Data

US 2019/0149916 A1 May 16, 2019

(30) Foreign Application Priority Data

May 27, 2016 (JP) ................................ 2016-106422

(51) Int. Cl.
*G10L 21/0264* (2013.01)
*G10K 11/178* (2006.01)
(Continued)

(52) U.S. Cl.
CPC ....... *H04R 3/005* (2013.01); *G10K 11/17835* (2018.01); *G10L 21/0224* (2013.01);
(Continued)

(58) Field of Classification Search
CPC .......... G10K 11/178; G10K 11/17835; H04M 1/6033; H04R 3/12; H04R 3/005;
(Continued)

(56) References Cited

U.S. PATENT DOCUMENTS

2006/0167659 A1* 7/2006 Miyasaka .............. B61F 15/20 702/185
2009/0052700 A1* 2/2009 Takumai ................. H04R 3/12 381/303

(Continued)

FOREIGN PATENT DOCUMENTS

JP 2014-068066 4/2014

OTHER PUBLICATIONS

International Search Report, dated Jul. 11, 2017, from the Japan Patent Office (JPO) for the International Patent Application No. PCT/JP2017/015639.

*Primary Examiner* — Vivian C Chin
*Assistant Examiner* — Ubachukwu A Odunukwe
(74) *Attorney, Agent, or Firm* — Greenblum & Bernstein, P.L.C.

(57) ABSTRACT

An audio processing system is provided with a speaker, a plurality of microphones, and an audio processing device. The audio processing device includes a plurality of filters that allow audio signals of audio collected by the plurality of microphones to pass any respective first bands included in a band of the audio output from the speaker, a plurality of delayers that delay the audio signals passed through the plurality of filters by delay times corresponding to the first bands respectively, a correlation value calculator that calculates a correlation value of a plurality of audio signals delayed respectively by the plurality of delayers and an audio signal of the audio output from the speaker, and a determinator that determines presence or absence of abnor- (Continued)

mality in the plurality of microphones and the speaker based on the correlation value.

17 Claims, 9 Drawing Sheets

(51) Int. Cl.

| | |
|---|---|
| ***H04R 3/12*** | (2006.01) |
| ***H04M 1/60*** | (2006.01) |
| ***H04R 3/00*** | (2006.01) |
| ***H04R 29/00*** | (2006.01) |
| ***G10L 21/0224*** | (2013.01) |
| ***H04R 3/04*** | (2006.01) |
| ***H04R 5/027*** | (2006.01) |
| ***H04R 5/04*** | (2006.01) |
| *G10L 21/0216* | (2013.01) |

(52) U.S. Cl.

CPC ................. *H04R 3/00* (2013.01); *H04R 3/04* (2013.01); *H04R 5/027* (2013.01); *H04R 5/04* (2013.01); *H04R 29/00* (2013.01); *H04R 29/002* (2013.01); *H04R 29/005* (2013.01); *G10L 2021/02166* (2013.01); *H04R 2410/05* (2013.01); *H04R 2420/05* (2013.01); *H04R 2499/13* (2013.01)

(58) Field of Classification Search

CPC ............ H04R 2410/05; G10L 21/0224; G10L 2021/02166; G10L 21/0264; G10L 21/00

USPC ....................... 381/71.1, 71.6, 303; 702/185; 379/420.02

See application file for complete search history.

(56) References Cited

U.S. PATENT DOCUMENTS

2009/0268899 A1* 10/2009 Tokuda ............... H04M 1/6033 379/420.02

2010/0290635 A1* 11/2010 Shridhar .............. G10K 11/178 381/71.1

* cited by examiner

AUDIO PROCESSING SYSTEM, AUDIO PROCESSING DEVICE, AND AUDIO PROCESSING METHOD

TECHNICAL FIELD

The present disclosure relates to an audio processing system, an audio processing device, and an audio processing method.

BACKGROUND ART

Active noise control (ANC) technology of canceling noise by sound of an opposite phase is known (refer to NTL1). There are several control methods for ANC. For example, in a feedforward type, ANC control is performed using a reference microphone, an error microphone, and a secondary sound source speaker.

The reference microphone detects a reference signal (for example, audio as a noise source). The error microphone is a microphone for observing a noise reduction effect. The secondary sound source speaker outputs pseudo noise to cancel out the noise. The signal detected by the reference microphone is processed through a noise control filter, and becomes the pseudo noise output from the secondary sound source speaker. The coefficient of the noise control filter is adjusted by mutual cancellation of the noise and the pseudo noise so that the error signal detected by the error microphone is minimized.

In order to sufficiently reduce the noise using the ANC, it is necessary that a microphone (reference microphone or error microphone) and a speaker (secondary sound source speaker) are operating normally. As a technique for detecting abnormality in the microphone and the speaker, a disconnection detection circuit disclosed in PTL 1 is known. The disconnection detection circuit picks up sound output from a single speaker with a single microphone, and detects disconnection of the speaker and the microphone by comparing a speaker signal and a microphone signal.

However, in a case where there are a plurality of microphones and speakers in a vehicle, it is difficult to carry out an abnormality test of the microphone and the speaker in a short time.

An object of the present disclosure is to shorten time required for the abnormality test of a speaker and a microphone to determine presence or absence of abnormality even in a case where there are a plurality of microphones and speakers in a vehicle.

CITATION LIST

Patent Literature

PTL 1: Japanese Patent Unexamined Publication No. 2014-68066

Non-Patent Literature

NPT 1: Nishimura Masaharu, Kajikawa Yoshinobu, “2 groups (image/sound/language) 6th Edition (acoustic signal processing) Chapter 6 (active noise control” The Institute of Electronics. Information and Communication Engineers, 2012

SUMMARY OF THE INVENTION

An audio processing system of the present disclosure includes a speaker that outputs audio; a plurality of microphones that collect the audio; and an audio processing device that determines presence or absence of abnormality in the plurality of microphones and the speaker based on the audio collected by the microphone. The audio processing device includes a plurality of first filters that allow audio signals of audio collected by the plurality of microphones to pass any respective first bands included in a band of the audio output from the speaker, a plurality of first delayers that delay the audio signals passed through the plurality of first filters by delay times corresponding to the first bands respectively, a correlation value calculator that calculates a correlation value of a plurality of audio signals delayed respectively by the plurality of first delayers and an audio signal of the audio output from the speaker, and a determinator that determines presence or absence of abnormality in the plurality of microphones and the speaker based on the correlation value.

An audio processing device of the present disclosure determines presence or absence of abnormality in a speaker that outputs audio and a plurality of microphones that collects the audio. The audio processing device includes a plurality of filters that allow audio signals of audio collected by the plurality of microphones to pass any respective first bands included in a band of the audio output from the speaker, a plurality of delayers that delay the audio signals passed through the plurality of filters by delay times corresponding to the first bands respectively, a correlation value calculator that calculates a correlation value of a plurality of audio signals delayed respectively by the plurality of delayers and an audio signal of the audio output from the speaker, and a determinator that determines presence or absence of abnormality in the plurality of microphones and the speaker based on the correlation value.

An audio processing method of the present disclosure that determines presence or absence of abnormality in a speaker that outputs audio and a plurality of microphones that collects the audio, includes allowing audio signals of audio collected by the plurality of microphones to pass any respective first bands included in a band of the audio output from the speaker, delaying the audio signals passed through any respective first bands by delay times corresponding to the first bands respectively, calculating a correlation value of a plurality of delayed audio signals and an audio signal of the audio output from the speaker, and determining presence or absence of abnormality in the plurality of microphones and the speaker based on the correlation value.

According to the present disclosure, it is possible to shorten the time required for the abnormality test of a speaker and a microphone to determine presence or absence of the abnormality even in a case where there are a plurality of microphones and speakers in the vehicle.

DESCRIPTION OF EMBODIMENTS

Figure 1:
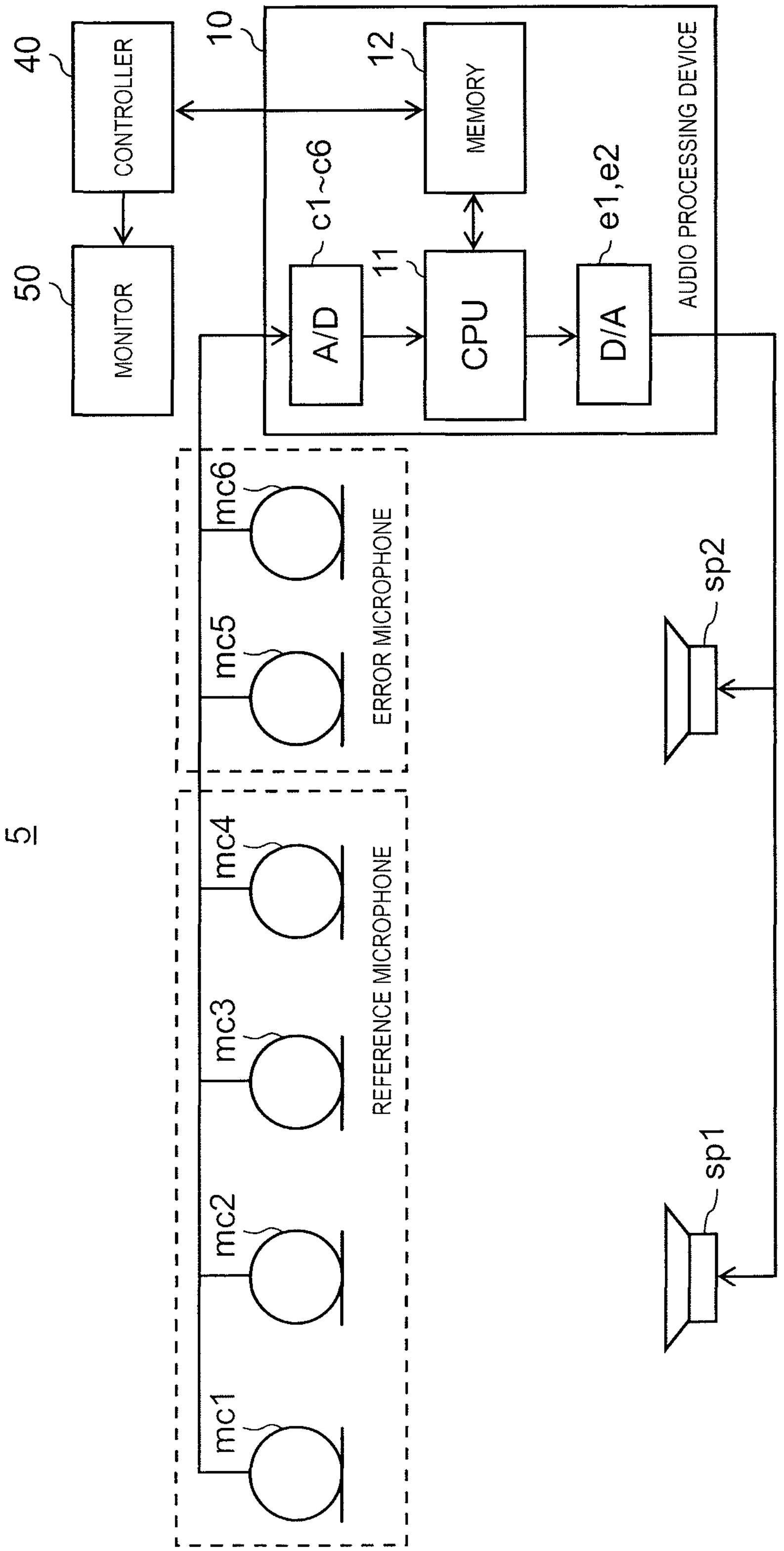
FIG. 1 is a block diagram showing a schematic configuration example of an audio processing system in a first embodiment.

Hereinafter, embodiments will be described in detail with reference to the drawings as appropriate. However, unnecessarily detailed description may be omitted. For example, detailed descriptions of already well-known matters and redundant description on substantially the same configuration may be omitted. This is to avoid making the following description unnecessarily redundant and to facilitate understanding by those skilled in the art. The accompanying drawings and the following description are provided to enable those skilled in the art to fully understand the present disclosure, and are not intended to limit the claimed subject matter.

(Background to Obtain One Embodiment of Present Disclosure)

ANC technology may be used to reduce engine noise that can be heard on the seat side when boarding an aircraft. When an ANC system is used in an aircraft, it is assumed that a self-diagnosis is performed and presence or absence of abnormality of speakers and microphones is inspected.

In the technique disclosed in PTL 1, even in a case where there are a plurality of microphones and speakers as a test target, it is necessary to carry out an abnormality test one by one, and thereby it takes a long time to complete the abnormality test for all microphones and speakers. In this case, since it takes a long time for the abnormality test when the abnormality test is carried out during aircraft maintenance or pre-flight preparation, there is a possibility of troubles. In a case where audio (or sound) from the speakers is not detected by the microphones, it is difficult to isolate the abnormalities whether it is abnormality of the microphones or abnormality of the speakers.

Hereinafter, an audio (or sound) processing system, an audio (or sound) processing device, and an audio (or sound) processing method capable of shortening time required for the abnormality test of a speaker and a microphone and determining presence or absence of abnormality even in a case where there are a plurality of microphones and speakers in a vehicle will be described.

First Embodiment

The audio processing system according to the present embodiment can execute ANC using a speaker and a microphone. The audio processing system inspects (abnormality test) presence or absence of abnormality in speakers and microphones installed in a vehicle such as an aircraft.

The “abnormality” here means, for example, a speaker or a microphone itself is out of order, a speaker or a microphone is turned off and audio input or audio output is not done, the audio signal is not transmitted because a line connected to a speaker or a microphone is pulled out, and the audio signal is not transmitted to the connected speaker or microphone since the line is disconnected.

The speaker and microphone are used, for example, to reduce noise of a target such as engine sound that can be heard on a seat side when boarding an aircraft using active noise control (ANC) technology. The abnormality test of the speaker and the microphone is carried out at the time of manufacturing the aircraft, pre-flight preparation, maintenance, and the like.

[Configuration and the Like]

FIG. 1 is a block diagram showing a schematic configuration example of audio processing system 5 in a first embodiment. Some seats (first class or business class seats, for example) on an aircraft and the like are partitioned to surround the seat in a “U” shape, for example, by partition 75 (see FIG. 2). Audio processing system 5 as an ANC system to reduce noise (engine sound, for example) by the ANC technology is also installed in the aircraft using speakers sp1 and sp2 and microphones mc1 to mc6 disposed on partition 75.

In FIG. 1, audio processing system 5 inspects abnormality in six microphones mc1 to mc6 and two speakers sp1 and sp2. Audio processing system 5 includes microphones mc1 to mc6, speakers sp1 and sp2, audio processing device 10, control device 40, and monitor 50. The number of microphones and speakers may be any number. The closed space surrounding the seat may be formed by not only partition 75 alone but also by partition 75 and a wall surface, or any other methods.

Each configurator (microphones mc1 to mc6, speakers sp1 and sp2, audio processing device 10, control device 40, monitor 50) of audio processing system 5 is installed in the aircraft. As control device 40, for example, a main system that controls whole interior of the aircraft is assumed. As audio processing device 10, for example, a stationary or portable type computer device that is simpler than control device 40 and includes a processor or a memory is assumed.

Figure 2:
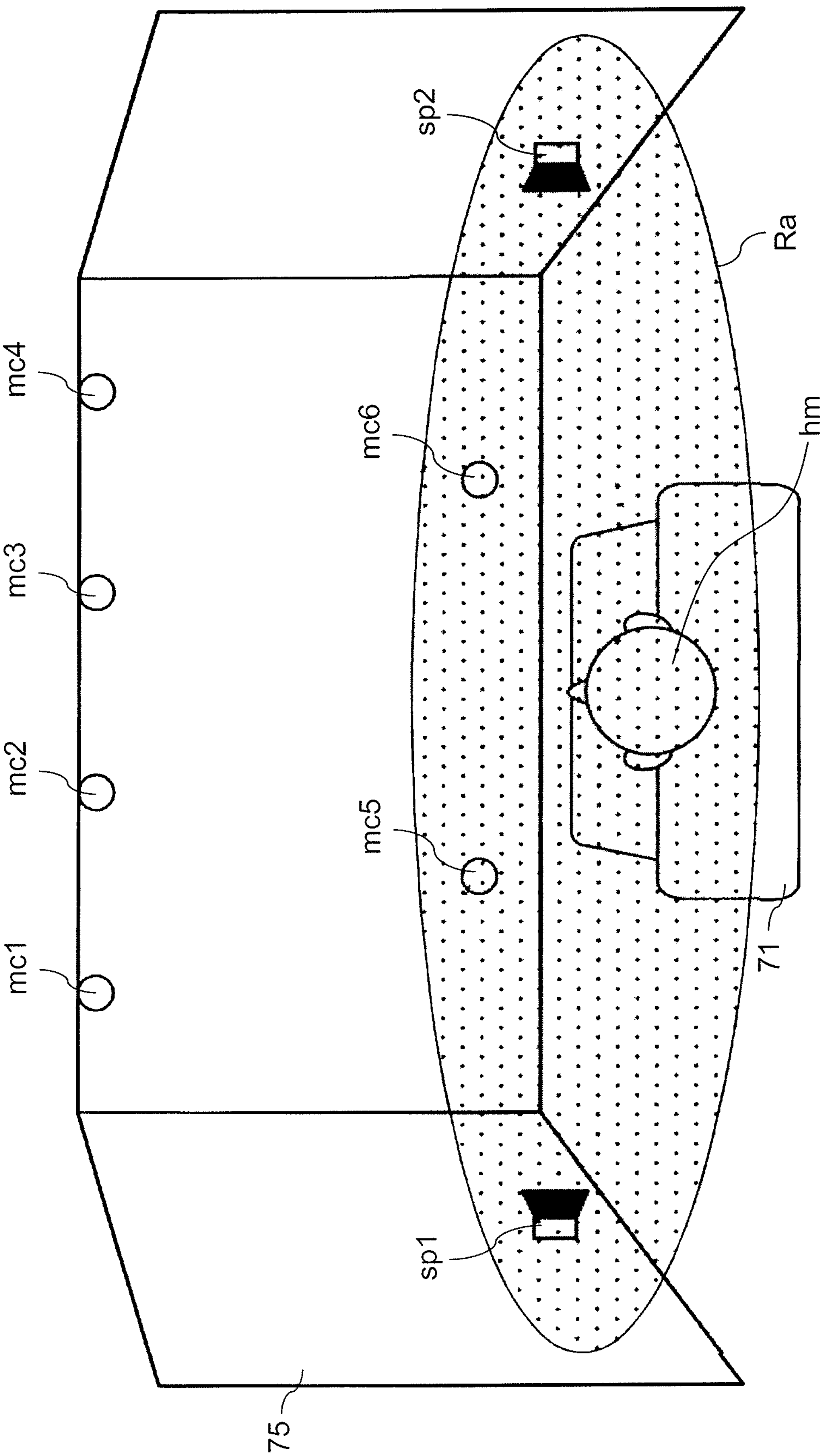
FIG. 2 is a schematic diagram showing a disposition example of microphones and speakers provided in a seat of an aircraft.

FIG. 2 is a schematic diagram showing a disposition example of six microphones mc1 to mc6 and two speakers sp1 and sp2 provided at seat 71 in an aircraft. In FIG. 2, region Ra indicated as dots exemplifies a range where passenger hm expects ANC effects. The disposition in FIG. 2 may not be changed during operation or the maintenance of the aircraft. That is, when the aircraft actually flies or abnormality test is carried out, the disposition of the microphones and the speakers may be the same.

In the ANC, six microphones mc1 to mc6 are divided into four reference microphones mc1 to mc4 and two error microphones mc5 and mc6. However, in the abnormality test, the reference microphones and the error microphones are handled equally without being distinguished from each other.

Four reference microphones mc1 to mc4 are, for example, arranged in a row above partition 75 erected on the front face of seat 71 where passenger hm is seating, and collects ambient audio (engine sound, other sounds, for example). The engine sound is, for example, a sound having a band of 500 Hz to 1 kHz.

Two error microphones mc5 and mc6 are, for example, disposed side by side below front partition 75, and collects both audio output from speakers sp1 and sp2 to cancel noise and ambient audio.

Two speakers sp1 and sp2 are, for example, disposed so as to be opposed below a pair of partitions 75 provided on both sides of seat 71. Two speakers sp1 and sp2 output audio in which ambient audio is converted into an opposite phase so as to cancel the ambient audio.

"Audio" (or "sound") handled by microphones and speakers included in audio processing system 5 broadly includes audio spoken by people, audio of animals other than people, environmental sounds, engine sound, mechanical sounds, and other sounds.

Audio processing device 10 includes central processing unit (CPU) 11, memory 12, A/D converters c1 to c6, and D/A converters e1 and e2.

A/D converters c1 to c6 convert analog audio signals collected by six microphones mc1 to mc6 into digital audio data (simply referred to as audio data).

CPU 11 controls operation of each portion in audio processing device 10 by executing a program stored in memory 12 and performs the abnormality test operation described below. CPU 11 inputs audio data from A/D converters c1 to c6, and performs various processes on the audio data. CPU 11 is an example of a processor, and may be configured of other processors (digital signal processor (DSP) for example).

Memory 12 includes a primary storage such as random access memory (RAM) and read only memory (ROM). Memory 12 may include a secondary storage such as a hard disk drive (HDD) and a solid state drive (SSD). Memory 12 stores various data, programs, and setting information.

D/A converters e1 and e2 convert the audio data output from CPU 11 into analog audio signals (simply referred to as audio signal). The converted audio signal is sent to speakers sp1 and sp2.

Control device 40 performs setting related to parameters (for example, passband of filter, delay time of delayer) of one or more audio processing devices 10. For example, control device 40 sets information such as passbands of band pass filters (BPF) 21 to 28, delay times of delayers 31 to 36, and the like described below. Control device 40 and audio processing device 10 may be connected by either wired communication line or wireless communication line, and various settings may be made using the communication. Various settings may be made without using the communication.

Monitor 50 displays various information under the control of control device 40. For example, monitor 50 displays graphs (see FIG. 4A to FIG. 4D of correlation values described below, and abnormality test results (abnormality determination results) of speakers and microphones.

Figure 3:
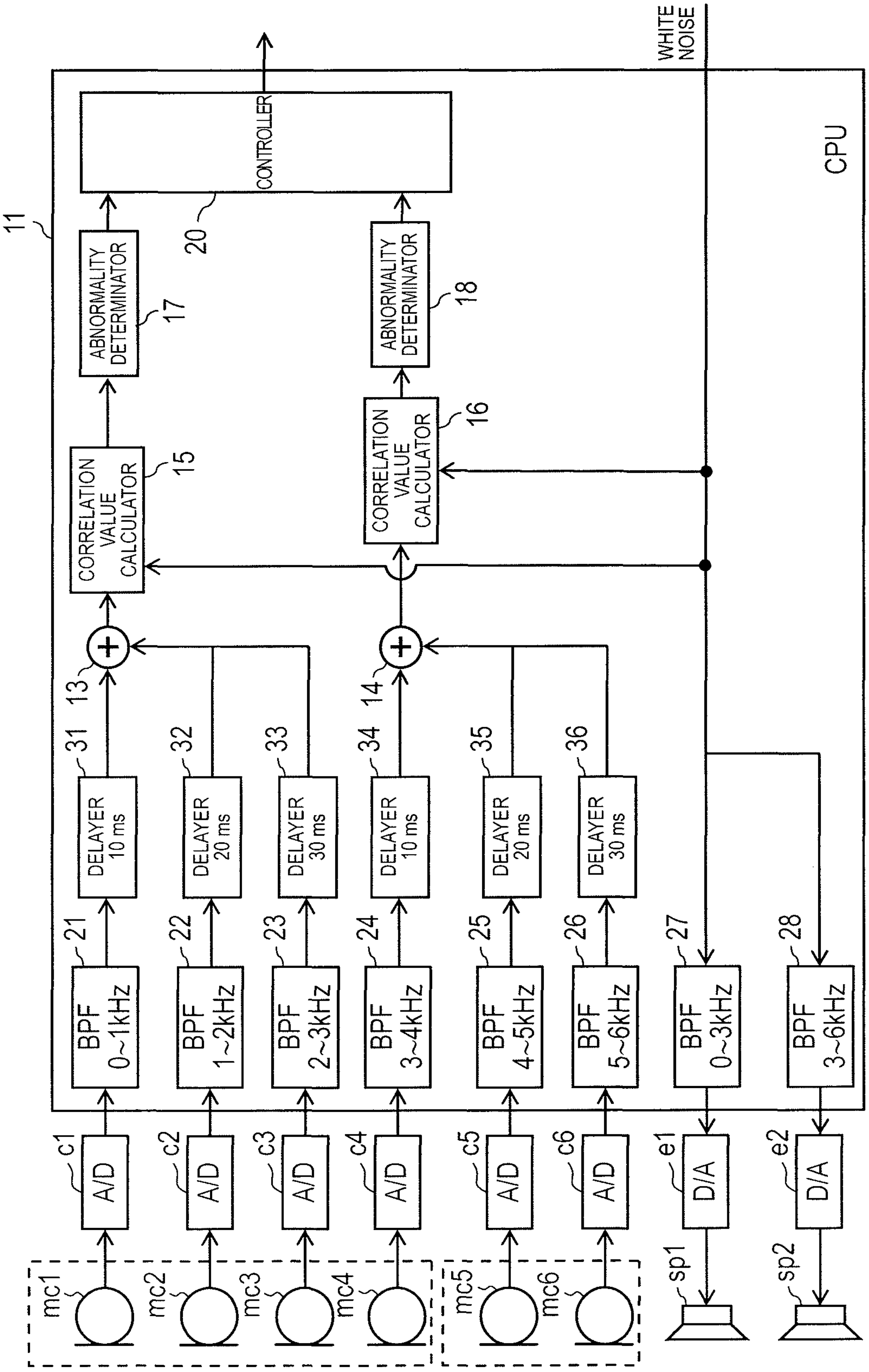
FIG. 3 is a block diagram showing a configuration example of a part of the audio processing system including a functional configuration example of a CPU.

FIG. 3 is a block diagram showing a configuration example of a part of audio processing system 5 including a functional configuration example of CPU 11. CPU 11 includes six BPFs 21 to 26 for microphone, two BPFs 27 and 28 for speaker, delayers 31 to 36, adders 13 and 14, correlation value calculators 15 and 16, abnormality determinators 17 and 18, and controller 20. In FIG. 3, it is exemplified that CPU 11 functionally has functions of each portion, but it may include dedicated hardware for realizing each function.

BPFs 21 to 26 for microphone allow the audio data having bands of 0 to 1 kHz, 1 to 2 kHz, 2 to 3 kHz, 3 to 4 kHz, 4 to 5 kHz, and 5 to 6 kHz to pass, respectively. BPFs 27 and 28 for speaker allow audio data having bands of 0 to 3 kHz and 3 to 6 kHz to pass, respectively. Each passband of audio data described above is an example, and the passband is optional.

Delayers 31 to 33 delay audio data extracted from BPFs 21 to 23 by 10 msec, 20 msec, and 30 msec, respectively. Delayers 34 to 36 delay audio data extracted from BPFs 24 to 26 by 10 msec, 20 msec, and 30 msec, respectively. Each delay time described above is an example, and a length of delay time is optional.

Adder 13 adds and outputs the audio data output from delayers 31, 32, and 33. Correlation value calculator 15 calculates a correlation value of the audio data output from adder 13, and audio data respectively output from BPFs 27 and 28 for speaker (audio data of white noise in FIG. 3).

Abnormality determinator 17 determines presence or absence of abnormality of speaker sp1 and microphones mc1 to mc3 based on a comparison result of the correlation value calculated with correlation value calculator 15 and threshold value th1 at each timing according to the delay times of delayers 31, 32, and 33. For example, in a case where the correlation value is less than threshold value th1 at a predetermined timing, abnormality determinator 17 determines that there is abnormality in the microphone corresponding to the predetermined timing. On the other hand, in a case where the correlation value is equal to or larger than threshold value th1 at a predetermined timing, abnormality determinator 17 determines that the microphone corresponding to the predetermined timing is normal. The determination result of abnormality determinator 17 is input into controller 20. Details of abnormality determination will be described below.

Similarly, adder 14 adds and outputs the audio data output from delayers 34, 35, and 36. Correlation value calculator 16 calculates the correlation value of the audio data output from adder 14 and audio data (white noise in FIG. 3) respectively output from BPFs 27 and 28 for speaker.

Abnormality determinator 18 determines presence or absence of abnormality of speaker sp2 and microphones mc4 to mc6 based on a comparison result between the correlation value calculated with correlation value calculator 16 and threshold value th1 at each timing of delay times corresponding to delayers 34, 35, and 36. For example, in a case where the correlation value is less than threshold value th1 at a predetermined timing, abnormality determinator 18 determines that there is abnormality in the microphone corresponding to the predetermined timing. On the other hand, in a case where the correlation value is equal to or larger than threshold value th1 at a predetermined timing, abnormality determinator 18 determines that the microphone corresponding to the predetermined timing is normal. The determination result of abnormality determinator 18 is input into controller 20. Details of the abnormality determination will be described below.

When values of passbands of BPFs 21 to 28 and delay times of delayers 31 to 36 are input from control device 40, controller 20 sets these values and holds the setting information in memory 12. Controller 20 outputs the determination result by abnormality determinators 17 and 18 to control device 40.

FIGS. 4A to 4D are graphs showing a temporal change example of a correlation value calculated by correlation value calculators 15 and 16. A vertical axis of graphs indicates the correlation value, and a horizontal axis indicates time. The time calculated by the correlation value is shifted backward as the delay time of a delayer is large, the time of the horizontal axis corresponds to the length of the delay time.

Here, a combination of microphones mc1, mc2, and mc3 and speaker sp is regarded as one group of the abnormality test target. A combination of microphones mc4, mc5, and mc6 and speaker sp2 is regarded as another one group of the abnormality test target. It is optional that which one or more microphones and which one or more speakers are combined to form a group.

In these groups, the abnormality test may be carried out simultaneously, or may be carried out at different timings. Even if the abnormality test is carried out in a plurality of groups simultaneously, frequency bands of the audio data used for the abnormality test are different from each other, and audio processing system 5 can carry out the abnormality determination of the speakers and microphones promptly without confusion.

Here, the case where presence or absence of abnormality is determined for the combination of microphones mc1, mc2, and mc3 and speaker sp1 will be exemplified. The same applies to the combination of microphones mc4, mc5, and mc6 and speaker sp2.

In the same group to be subjected to the abnormality test, the band (0 to 3 kHz, for example) obtained by combining passbands of BPF (BPFs 21, 22, and 23, for example) connected to each microphone (microphones mc1, mc2, and mc3, for example) is included in or matches the band (0 to 3 kHz, for example) obtained by combining passbands of BPF (BPF 27, for example) connected to each speaker (speaker sp1, for example).

Figure 4A:
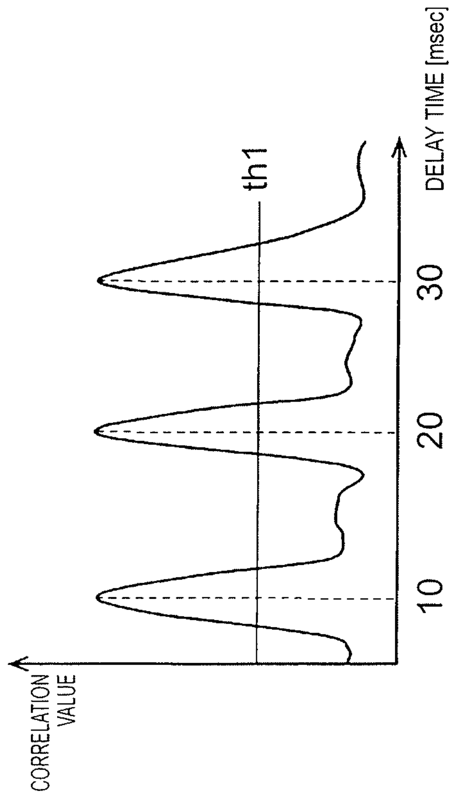
FIG. 4A is a graph showing a temporal change example of a correlation value calculated by a correlation value calculator.

In FIG. 4A correlation value peaks appear at each delay time of 10 msec, 20 msec, and 30 msec. In this case, abnormality determinator 17 determines that speaker sp1 and all microphones mc1, mc2, and mc3 for the abnormality test target are normal.

Figure 4B:
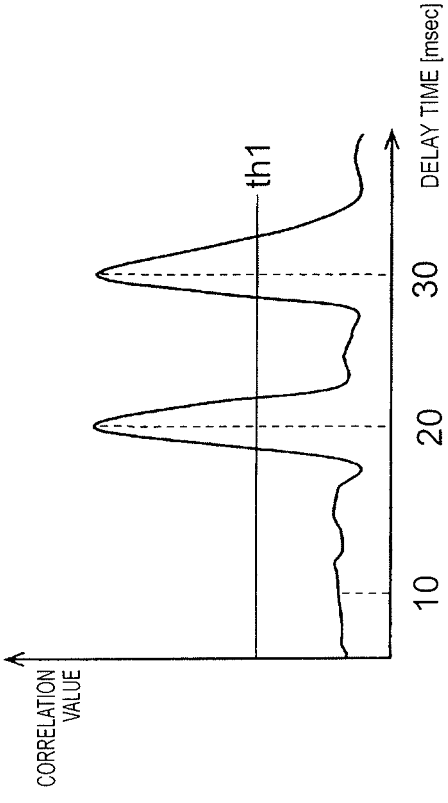
FIG. 4B is a graph showing a temporal change example of a correlation value calculated by the correlation value calculator.

In FIG. 4B correlation value peaks appear at the delay time of 20 msec and 30 msec, but no correlation value peak appears at the delay time of 10 msec. In this case, abnormality determinator 17 determines that speaker sp1 and microphones mc2 and mc3 of the abnormality test target are normal, and there is abnormality in microphone mc1.

Figure 4C:
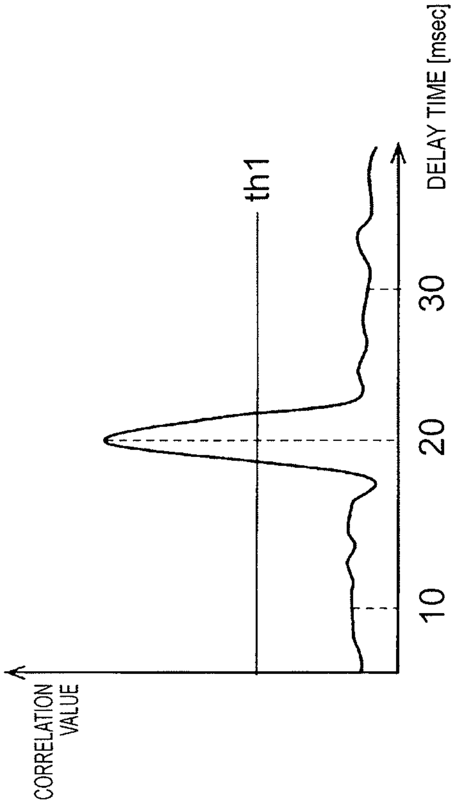
FIG. 4C is a graph showing a temporal change example of a correlation value calculated by the correlation value calculator.

In FIG. 4C a correlation value peak appears at the delay time of 20 msec, but no correlation value peak appears at the delay times of 10 msec and 30 msec. In this case, abnormality determinator 17 determines that, speaker sp1 and microphone mc2 of the abnormality test target are normal, and there are abnormalities in two microphones mc1 and mc3.

Figure 4D:
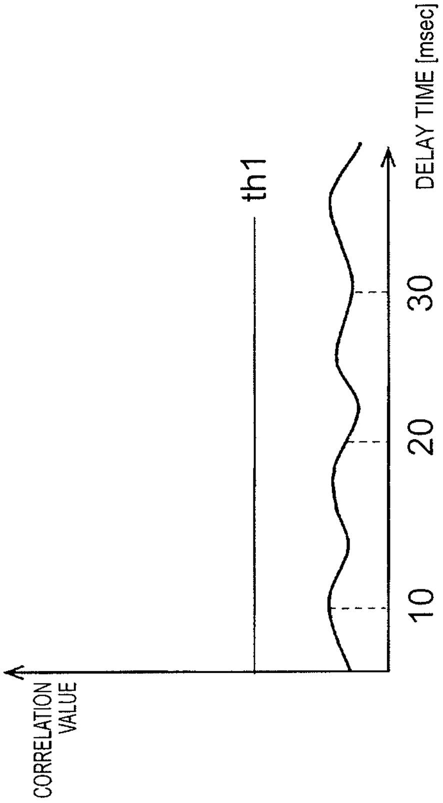
FIG. 4D is a graph showing a temporal change example of a correlation value calculated by the correlation value calculator.

In FIG. 4D no correlation value peak appears at any delay time of 10 msec, 20 msec, and 30 msec. In this case, abnormality determinator 17 determines that there is abnormality in speaker sp1 or all of three microphones mc1, mc2, and mc3.

Since speaker sp1 does not emit audio when there is abnormality in speaker sp1, it is assumed that all microphones mc1 to mc3 cannot pick up the audio at all. Even if speaker sp1 emits audio, in a case where there are abnormalities in all of microphones mc1 to mc3, it is assumed that all of microphones mc1 to mc3 cannot pick up the audio at all.

In this case, for example, by switching BPF 27 connected to speaker sp1 to BPF 28, that is, by switching the passband of BPF 27 to the passband of BPF 28, there is a possibility that it is possible to determine whether the abnormality is on the speaker side or on the microphone side as described below. The details will be described later.

[Operations and the Like]

Next, operations of audio processing system 5 will be described.

In audio processing system 5, abnormality test is carried out without distinguishing reference microphones mc1 to mc4 and error microphones mc5 and mc6. For example, the abnormality test is carried out by setting reference microphones mc1 to mc3 as a first group, and reference microphone mc4 and error microphones mc5 and mc6 as a second group. In this case, in the first group, reference microphones mc1 to mc3 collect the audio emitted from speaker sp1. In the second group, reference microphone mc4 and error microphones mc5 and mc6 collect the audio emitted from speaker sp2.

Figure 5:
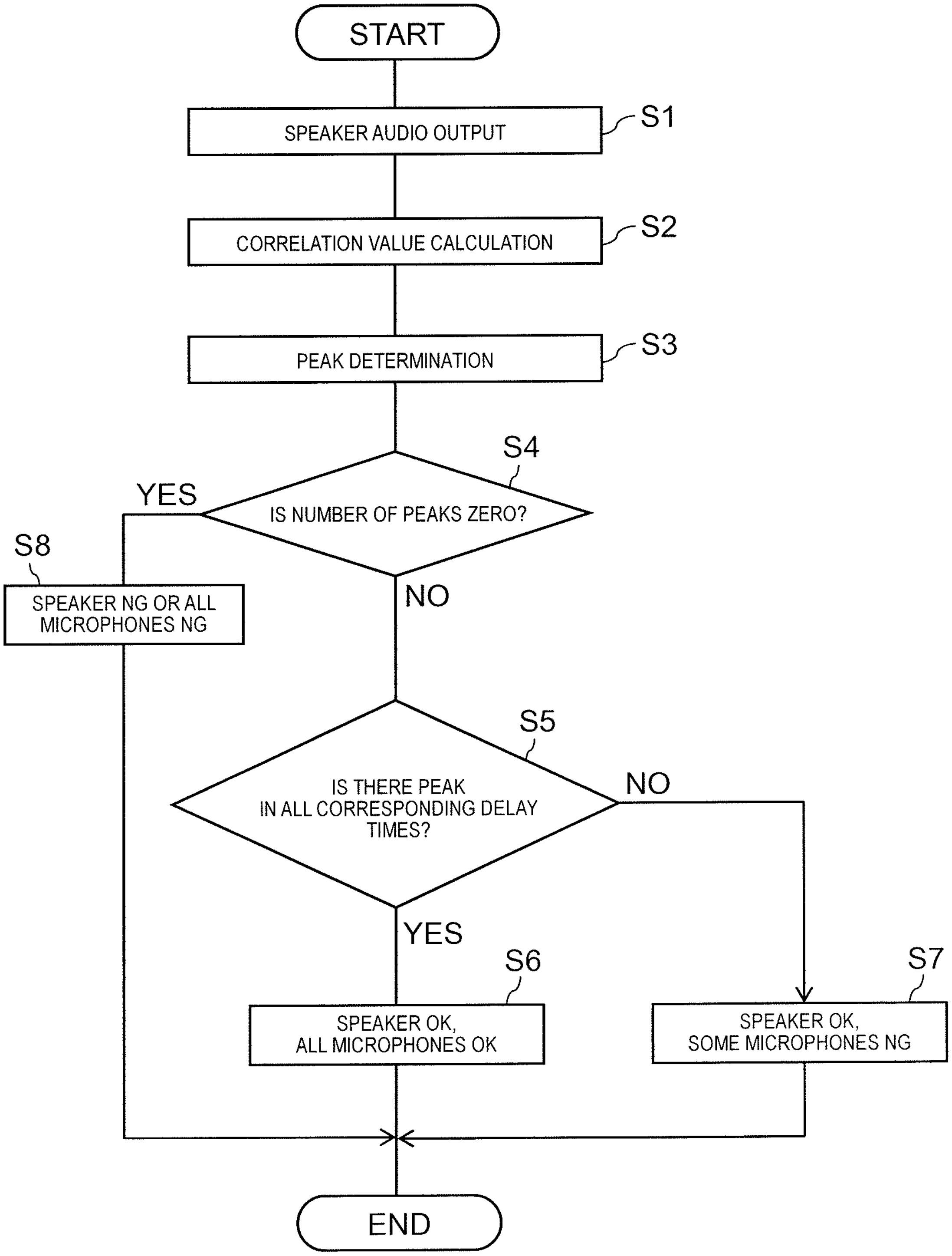
FIG. 5 is a flowchart showing an example of an abnormality test operation procedure.

FIG. 5 is a flowchart showing an example of abnormality test operation procedure. The abnormality test operation is performed by CPU 11. In FIG. 5, in the first group and the second group, for example, the abnormality test is carried out simultaneously.

Controller 20 in CPU 11 sends the audio data (audio data of white noise, for example) stored in memory 12 to speakers sp1 and sp2 sides, and outputs the audio from speakers sp1 and sp2 (S1).

On speaker sp1 side, when the audio data with band 0 to 3 kHz among the audio data passes through BPF 27, and is converted into an audio signal by D/A converter e1, audio with band 0 to 3 kHz is emitted from speaker sp1.

On speaker sp2 side, when the audio data with band 3 to 6 kHz among the audio data passes through BPF 28, and the audio signal is converted into an audio signal by D/A converter e2, audio with band 3 to 6 kHz is emitted from speaker sp2.

The audio emitted from speaker sp1 is collected by microphones mc1 to mc3. The audio signal collected by microphones mc1 to mc3 is converted into audio data by A/D converters c1 to c3, respectively. These audio data are classified into audio data of 0 to 1 kHz, audio data of 1 to 2 kHz, and audio data of 2 to 3 kHz by BPFs 21 to 23, respectively. Therefore, the audio data passed through BPFs 21 to 23 is distinguished as data corresponding to each microphones mc1 to mc3.

The audio data of 0 to 1 kHz, audio data of 1 to 2 kHz, and audio data of 2 to 3 kHz are delayed respectively by each delayers 31, 32, and 33 at delay times of 10 msec, 20 msec, and 30 msec and is input into adder 13. Adder 13 calculates and outputs these audio data.

Similarly, the audio emitted from speaker sp2 is collected by microphones mc4 to mc6. The audio signal collected by microphones mc4 to mc6 is converted into audio data by A/D converters c4 to c6, respectively. These audio data are classified into each audio data of 3 to 4 kHz, audio data of 4 to 5 kHz, and audio data of 5 to 6 kHz by BPFs 24 to 26. Therefore, the audio data passed through BPFs 24 to 26 is distinguished as data corresponding to each microphones mc4 to mc6.

The audio data of 3 to 4 kHz, audio data of 4 to 5 kHz, and audio data of 5 to 6 kHz are delayed by each delayers 34, 35, and 36 at delay times of 10 msec, 20 msec, and 30 msec and is input into adder 14. Adder 14 adds and outputs these audio data.

Correlation value calculators 15 and 16 calculate the correlation value with respect to audio data from adders 13 and 14 respectively, according to (Equation 1) for example (S2).

[Equation 1]

$$C(\tau)=\Sigma_t m(\tau-t)*s(t) \quad \text{(Equation 1)}$$

Here, τ indicates shifted time (delay time) that a microphone signal (audio signal input into microphone) is shifted temporally, and corresponds to time axis of a correlation function. m(τt) indicates the microphone signal shifted by τ time. t indicates current time in a speaker signal (audio signal output from speaker) and the microphone signal. s(t) indicates the speaker signal. C(τ) indicates the correlation function.

Abnormality determinators 17 and 18 determine the correlation value peaks respectively calculated by correlation value calculators 15 and 16 (S3). In the peak determination of the correlation value, for example, in a vicinity of delay time of 10 msec, 20 msec, and 30 msec, in a case where the audio signal input by a microphone is equal to or larger than preset threshold value th1, it is determined that there is a peak corresponding to the audio signal output from speakers sp1 and sp2. On the other hand, in a case where the audio signal input by a microphone is less than threshold value th1, it is determined that there is no peak corresponding to the audio signal output from speakers sp1 and sp2. Abnormality determinators 17 and 18 count number of existing peaks.

As a result of peak determination, abnormality determinators 17 and 18 determine whether the number of peaks is zero or not (S4). In a case where the number of peaks is not zero, abnormality determinators 17 and 18 determine whether there is a peak at corresponding delay time (here, 10 msec, 20 msec, 30 msec) or not (S5).

In a case where there are peaks in all of the corresponding delay times, abnormality determinator 17 determines that speaker sp1 and microphones mc1, mc2, and mc3 are normal (S6). Similarly, abnormality determinator 18 determines that speaker sp2 and microphones mc4, mc5, and mc6 are normal (S6). Thereafter, controller 20 ends the present operation.

On the other hand, at the corresponding delay time in S5, in a case where there is not at least one peak, abnormality determinator 17 determines speaker sp1 as normal, and determines that there is abnormality in the microphone corresponding to absent peak among microphones mc1, mc2, and mc3 (S7). Similarly, abnormality determinator 18 determines speaker sp2 as normal, and determines that there is abnormality in the microphone corresponding to absence of peaks among microphones mc4, mc5, and mc6 (S7). Thereafter, controller 20 ends the present operation.

Furthermore, as a result of the peak determination in S4, in a case where the number of peaks is zero, abnormality determinator 17 determines that there is abnormality in at least one of speaker sp1 or all of microphones mc1, mc2, and mc3 (S8). Similarly, abnormality determinator 18 determines that there is abnormality in at least one of speaker sp2 or all of microphones mc4, mc5, and mc6 (S8). Thereafter, controller 20 ends the present operation.

Audio processing device 10 notifies the abnormality determination result to control device 40. When control device 40 receives the abnormality determination result from audio processing device 10, monitor 50 displays the abnormality determination result.

Figure 6:
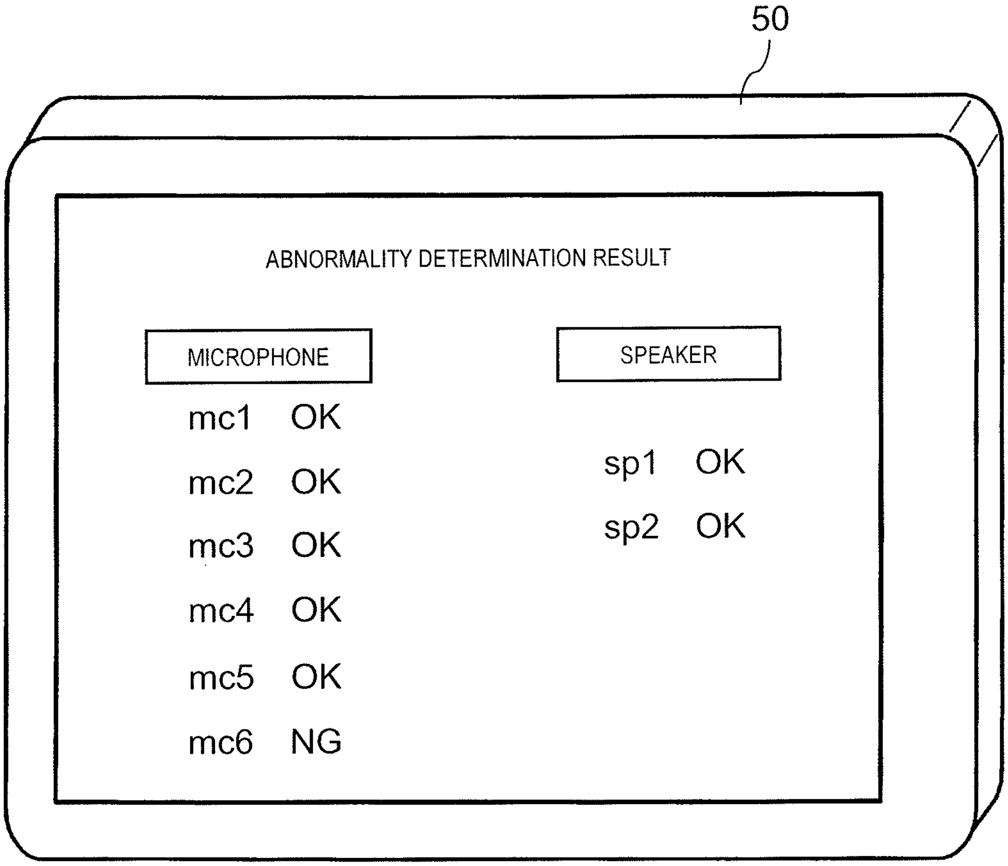
FIG. 6 is a schematic diagram showing a display example of an abnormality determination result.

FIG. 6 is a schematic diagram showing a display example of an abnormality determination result displayed on monitor 50. On monitor 50, a screen of the abnormality determination result is displayed. On the screen of the abnormality determination result, for example, "OK" is displayed in the case of normal, and "NG" is displayed in a case where there is abnormality with respect to the microphone and the speaker.

In FIG. 6, "NG" is displayed for microphone mc6, and "OK" is displayed for the others with respect to microphones mc1 to mc6 and speakers sp1 and sp2. That is, in FIG. 6, it is exemplified that microphone mc6 is determined to be abnormal.

In FIG. 6, it is exemplified that abnormality determination results of all of speakers sp1 and sp2 and microphones mc1 to mc6 of the abnormality test target are displayed, but some of the results may be omitted. That is, at least one abnormality determination result may be displayed among the abnormality test targets.

As shown in FIG. 4D in a case where no correlation value peak corresponding to all of microphones mc1, mc2, and mc3 appeared, for example, it is not possible to distinguish whether there is abnormality in all of microphones mc1, mc2, and mc3 or speaker sp1. In this case, on the abnormality determination screen of monitor 50, a message (question mark, for example) indicating that presence or absence of abnormality is unknown may be displayed with respect to the corresponding microphones mc1, mc2, and mc3 and speaker sp1.

In a case where there is no correlation value peak at each delay time as shown in FIG. 4D that is, in a case where the number of peaks is zero, BPF 28 that is connected to speaker sp2 and allows a signal of 3 to 6 kHz to pass may be switched to BPF 27 that allows a signal of 0 to 3 kHz to pass. Similarly, BPF 27 that is connected to speaker sp and allows the signal of 0 to 3 kHz to pass may be switched to BPF 28 that allows the signal of 3 to 6 kHz to pass. As described above, audio processing system 5 may perform the abnormality test operation in a state in which BPFs 27 and 28 are switched.

In order to switch passbands of BPF 27 and BPF 28, information of the passband set for BPF 27 and information of the passband set for BPF 28 may be switched. These passband settings of BPFs 27 and 28 may be performed by control device 40, for example. The passband setting information is, for example, held in memory 12 of audio processing device 10.

When passbands of BPFs 27 and 28 are switched, microphones mc1, mc2, and mc3 pick up the signal of 0 to 3 kHz output from speaker sp2, and no peaks appear in a case where all of microphones mc1, mc2, and mc3 are abnormal. On the other hand, in a case where speaker sp1 is abnormal, since at least one of microphones mc1, mc2, and mc3 collects the audio of 0 to 3 kHz output from speaker sp2 in a case where at least one of microphones mc1, mc2, and mc3 is not abnormal, the correlation value peak appears. Accordingly, audio processing system 5 can determine whether there is abnormality in microphones mc1, mc2, and mc3.

Similarly, when passbands of BPFs 27 and 28 are switched, microphones mc4, mc5, and mc6 pick up a signal of 4 to 6 kHz output from speaker sp1, and a peak does not appear when there is abnormality in all of microphones mc4, mc5, and mc6. On the other hand, in a case where speaker sp2 is abnormal, since at least one of microphones mc4, mc5, and mc6 collects audio of 4 to 6 kHz output from speaker sp1, a peak appears in a case where at least one of microphones mc4, mc5, and mc6 is not abnormal. Accordingly, audio processing system 5 determines whether there is abnormality in microphones mc4, mc5, and mc6 or not.

Since the engine sound is sound that has mainly a band of 0 to 1 kHz, controller 20 may set the passbands of BPFs 21 to 26 to be sequentially switched to 0 to 1 kHz so that the passbands of BPFs 21 to 26 corresponding to all of microphones mc1 to mc6 become 0 to 1 kHz. In this case, each passband of BPFs 21 to 26 corresponding to each of microphones mc1 to mc6 may be switched in a round robin manner. The setting of passband is performed by control device 40, for example.

That is, it is possible to improve suppression accuracy of the engine sound that is thought to be the main noise in the aircraft by control device 40 sequentially changing each passband of BPFs 21 to 26 corresponding to each microphones mc1 to mc6, and carrying out the abnormality test on all microphones in the band of 0 to 1 kHz corresponding to the frequency band of the engine sound.

As described above, audio processing system 5 can determine whether the audio of a band including the engine sound is collected, or whether there is no abnormality with respect to all microphones mc1 to mc6 by carrying out the abnormality test on the band of 0 to 1 kHz which is the main band of the engine sound for each of BPFs 21 to 26.

Next, the combination of the speaker and the microphone in the abnormality test, that is, a group formed for the abnormality test will be described.

In FIG. 2, speaker sp1 and microphones mc1, mc2, and mc3 are combined as an example of the first group for performing the abnormality test. As a second group, speaker sp2 and microphones mc4, mc5, and mc6 are combined as an example. Combinations of the speaker and the plurality of microphones may be combined in any other way and may be optionally changed.

For example, one group subjected to the abnormality test may be formed by combining the speakers and the microphones that are close to each other.

The magnitude of the correlation value calculated by correlation value calculators 15 and 16 depends on a signal level of the audio signal input by the microphones. Since each microphone inputs audio for abnormality test from the speaker, it is easier to input the audio signal output from the speaker when the microphone is located in a short distance from the speaker. Therefore, by forming groups by combining speakers and microphones in a distance close to each other, audio processing system 5 can easily determine the peak of the correlation value, and it is possible to improve the accuracy of the abnormality test.

Figure 7:
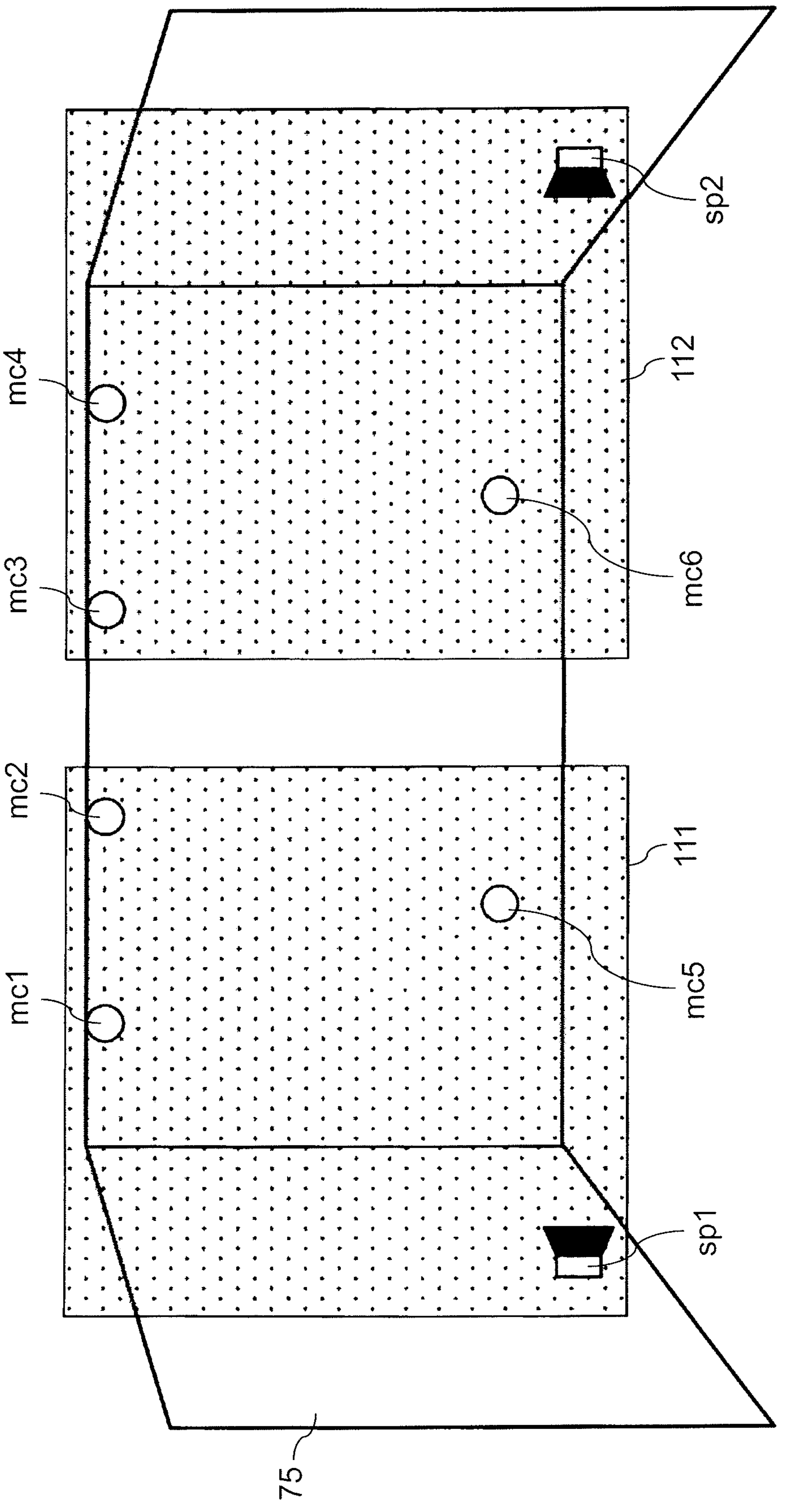
FIG. 7 is a schematic diagram showing an example of a combination of a speaker and a plurality of microphones as a group for carrying out the abnormality test.

FIG. 7 is a schematic diagram showing an example of combination of a speaker and a plurality of microphones in a short distance from each other as a group for carrying out the abnormality test. Short distance means that each speaker and microphone device is located within a predetermined short distance range from each other.

In FIG. 7, group A includes speaker sp1 and three microphones mc1, mc2, and mc5 in a close distance from speaker sp1. In FIG. 7, the speaker and the microphones of group A are disposed in first section 111.

In FIG. 7, group B includes speaker sp2 and three microphones mc3, mc4, and mc6 in a close distance from speaker sp2. In FIG. 7, the speaker and the microphones of group B are disposed in second section 112.

In this case, in audio processing system 5, microphones mc1, mc2, and mc5 collect the audio emitted from speaker sp1 that is in a short distance from each other, and the abnormality test is carried out. In audio processing system 5, microphones mc3, mc4, and mc6 collect audio emitted from speaker sp2 that is in a short distance from each other, and the abnormality test is carried out.

It becomes easier for each microphone to collect the audio emitted from a speaker present nearby, and audio processing device 10 can easily obtain the correlation value peak. The distances between the speaker and each microphone are approximately equalized, and it is expected that the variation of the correlation value based on the audio signals input from each microphone is reduced. Therefore, audio processing system 5 can improve the determination accuracy of the abnormality determination obtained by comparing the correlation value and threshold value th1.

It becomes difficult to collect other noises (disturbance, human voice, machine contact sound during maintenance, and the like) between the speaker and the microphone. Audio processing system 5 can improve the accuracy of the abnormality test.

In FIG. 7, it is exemplified that the number of microphones assigned to one speaker as an abnormality test target in the same group is the same. Instead, different number of microphones may be assigned to one speaker as the abnormality test target in the same group for each section that is a short distance range from the speaker. This also applies to the case of FIG. 2.

Modification Example

In the above-described embodiment, audio processing system 5 including a speaker and a plurality of microphones disposed in one seat area is exemplified. Control device 40 may simultaneously (at the same timing) operate audio processing system 5 including speakers and a plurality of microphones disposed in two or more seat areas.

In Modification Examples 1 and 2 described below, in a case where control device 40 operates two or more audio processing devices 10 simultaneously, audio processing system 5 performs the abnormality test distinctively for each area so that the sound emitted from the speaker and the audio collected by the plurality of microphones do not overlap in a plurality of areas.

In Modification Examples 1 and 2, audio processing device 10 is provided for each area. That is, audio processing system 5 in Modification Examples 1 and 2 includes a plurality of audio processing devices 10 (see FIGS. 8 and 9).

Modification Example 1

In Modification Example 1, audio processing system 5 divides the audio band used for the abnormality test for each adjacent area and performs the abnormality test.

Figure 8:
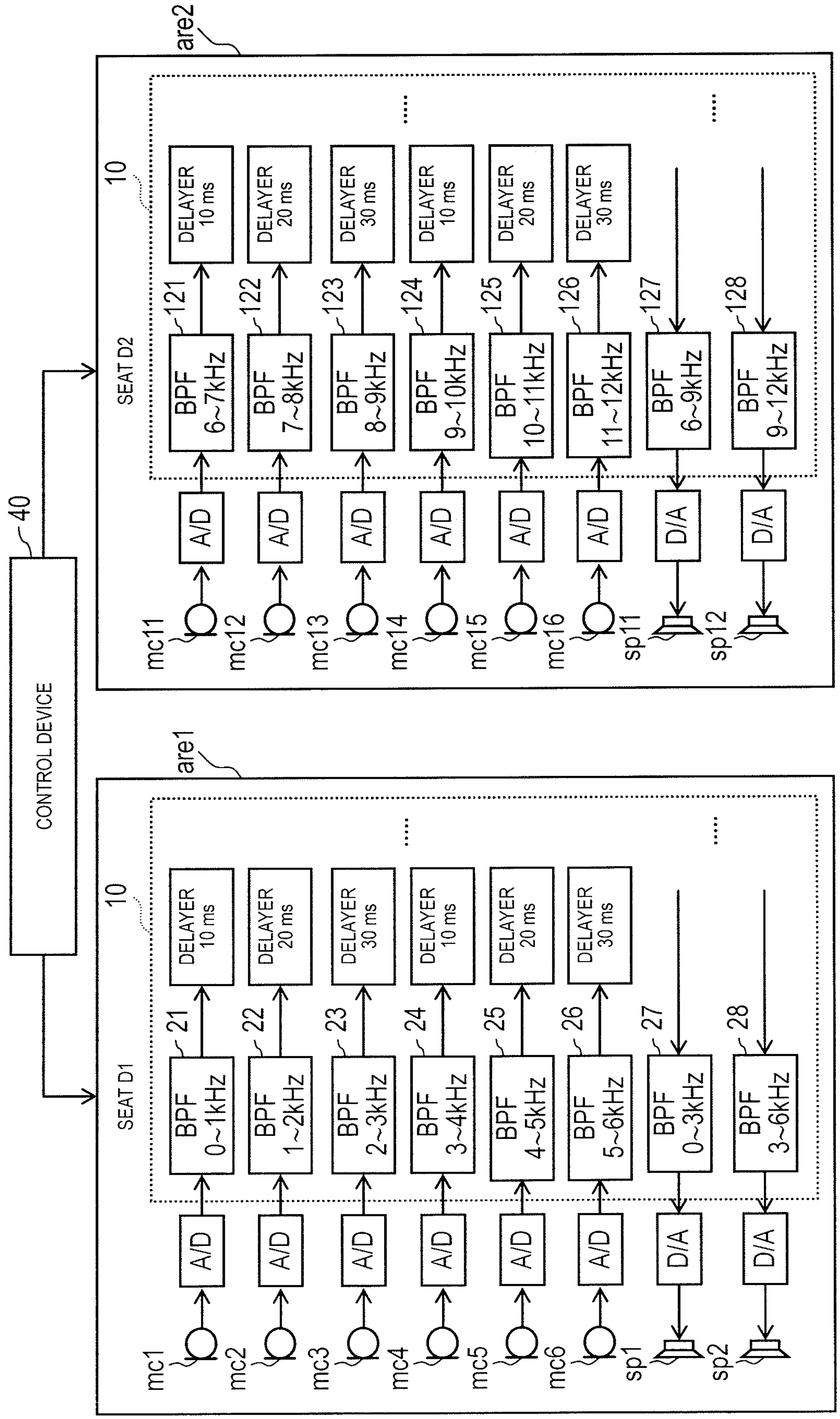
FIG. 8 is a block diagram showing setting of a band of BPF and setting of delay time in Modification Example 1.

FIG. 8 is a schematic diagram showing an example of setting of a band of BPF and setting of delay time in Modification Example 1. In order to make the description easier to understand, in FIG. 8, some blocks of audio processing device 10 are shown, and some symbols are omitted.

In first area are1 near seat D1, the abnormality test is carried out using the audio with bands of 0 to 3 kHz and 3 kHz to 6 kHz as in the above-described embodiment. On the other hand, in second area are2 near seat D2 adjacent to seat D1, the abnormality test is carried out using the audio with bands of 6 to 9 kHz and 9 to 12 kHz.

That is, in second area are2, speaker sp11 outputs audio of 6 to 9 kHz passed through BPF 127. BPFs 121 to 123 allow the audio of 6 to 7 kHz, 7 to 8 kHz, and 8 to 9 kHz respectively collected by microphones mc11 to mc13 to pass.

Similarly, speaker sp12 outputs the audio of 9 to 12 kHz passed through BPF 128. BPFs 124 to 126 allow the audio of 9 to 10 kHz, 10 to 11 kHz, and 11 to 12 kHz respectively collected by microphones mc14 to mc16 to pass.

Control device 40 may set the band of BPF in each audio processing device 10 in first area are1 and second area are2 so as to handle the audio having different bands. For example, control device 40 sets a band of 0 to 6 kHz as the band of BPF of audio processing device 10 in first area are1. Control device 40 sets the band of 6 to 12 kHz as the band of BPF of audio processing device 10 in second area are2.

Therefore, even if the abnormality test is carried out simultaneously in a plurality of seats (area), audio processing system 5 can suppress the confusion of audio related to the abnormality test for each area, and it is possible to efficiently carry out the abnormality test of the speaker and the microphone.

Even in a case where the abnormality test of the plurality of microphones and speakers used in the ANC system in the aircraft is carried out simultaneously in area units, for example, audio processing system 5 can suppress the influence of the abnormality test carried out in neighboring or adjacent areas.

Modification Example 2

In Modification Example 2, audio processing system 5 performs the abnormality test by shifting the timing for each adjacent area.

Figure 9:
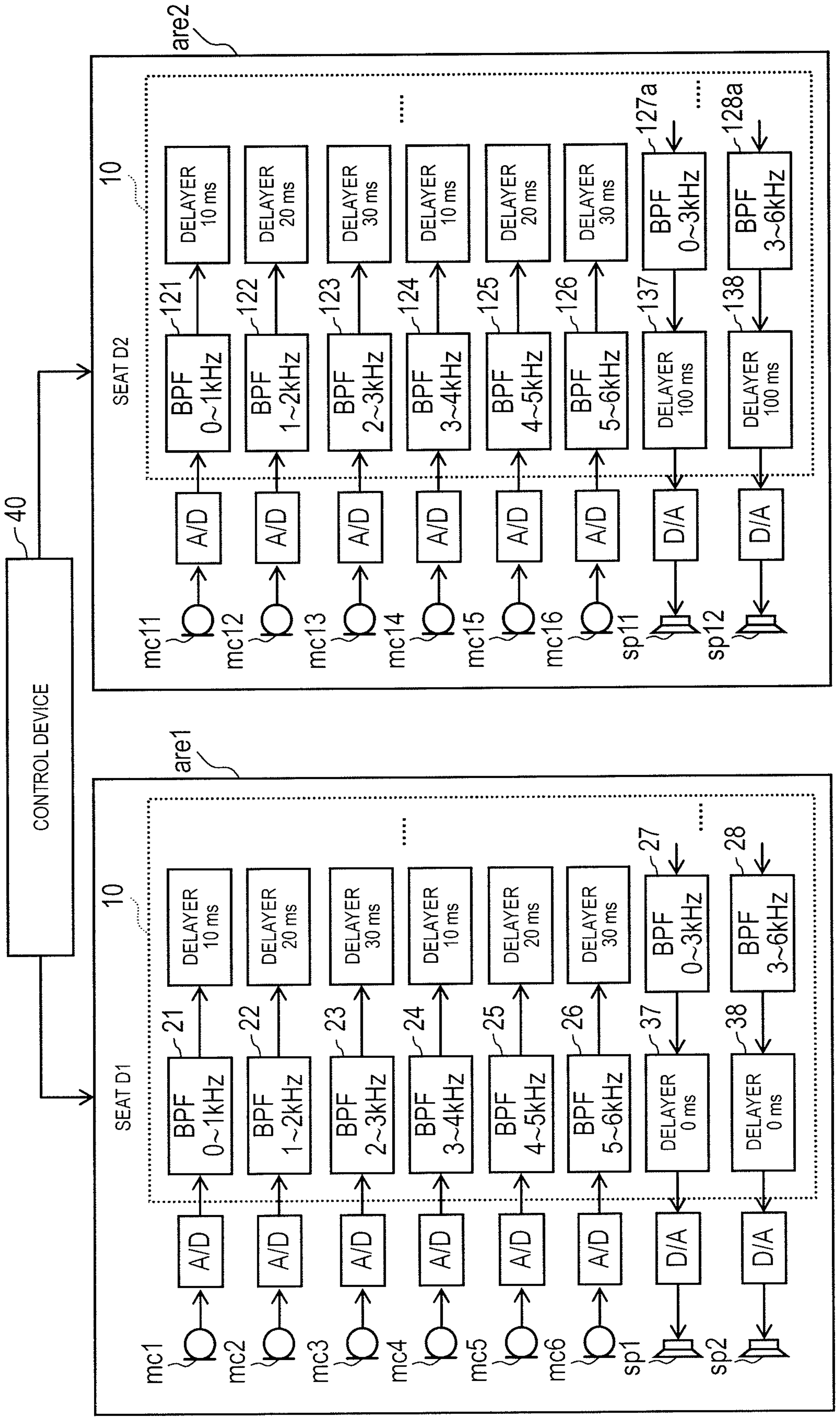
FIG. 9 is a block diagram showing setting of a band of BPF and setting of delay time in Modification Example 2.

FIG. 9 is a schematic diagram showing an example of setting a band of BPF and setting of delay time in Modification Example 2. As in Modification Example 1, in order to make the description easier to understand, in FIG. 9, some blocks of audio processing device 10 are shown, and some symbols are omitted.

In second area are2 that is a second seat area, delayers 137 and 138 are provided so that the timing of the sound output from speakers sp11 and sp12 is delayed by 100 msec respectively with respect to the timing of the sound output from speakers sp1 and sp2 in first area are1. Delayers 137 and 138 are included in CPU 11 of audio processing device 10 in second area are2.

Here, delaying 100 msec is exemplified in order to distinguish first area are1 and second area are2. However, this delay time is optional, and the delay time may be, for example, 200 msec, or 300 msec.

In FIG. 9, delayers 37 and 38 are provided with respect to speakers sp1 and sp2 in first area are1 that is a first seat area. However, the set delay time is zero, so it is substantially the same as the case where a delayer is not provided.

Any delay time may be set with respect to delayers 37 and 38. In this case, the delay time set in delayers 137 and 138 on speakers sp11 and sp12 side in second area are2 may be set to be delayed according to the delay time of delayers 37 and 38. That is, the delay time of delayers 37 and 38 in first area are1 and the delay time of delayers 137 and 138 in second area are2 may be different as long as the correlation value peak is recognizable.

Audio processing device 10 of second area are2 is provided with BPFs 127*a* and 128*a* connected to delayers 137 and 138. BPFs 127*a* and 128*a* have the same passband with BPFs 127 and 128 provided in audio processing device 10 in first area are1, different from Modification Example 1. That is, BPF 127*a* allows the audio data of 0 to 3 kHz to pass. BPF 128*a* allows the audio data of 3 to 6 kHz to pass.

Control device 40 may set different delay times in first area are1 and second area are2 in each audio processing device 10 corresponding to each area. For example, control device 40 sets zero as the delay time for speakers sp1 and sp2 by audio processing device 10 handling the signals of the speakers and the microphones in first area are1. Control device 40 sets 100 ms as the delay time for speakers sp11 and sp12 by audio processing device 10 in second area are2.

Therefore, even if the abnormality test is carried out simultaneously in a plurality of seats (area), audio processing system 5 can suppress the confusion of audio related to the abnormality test for each area, and it is possible to efficiently carry out the abnormality test of the speaker and the microphone.

As in Modification Example 1, even in a case where the abnormality test of the plurality of microphones and speakers used in the ANC system in the aircraft is carried out simultaneously in area units, for example, audio processing system 5 can suppress the influence of the abnormality test carried out in neighboring or adjacent areas.

According to Modification Examples 1 and 2, for example, during the maintenance or pre-flight preparation of an aircraft in an airport, it is possible to shorten the time required for the abnormality test of speakers and microphones executing ANC, and to efficiently carry out the abnormality test.

Audio processing system 5 according to Modification Examples 1 and 2 can carry out the abnormality test of the speakers and microphones in a plurality of areas simultaneously compared to a case where the abnormality test of the speakers and the microphones used in the ANC system is carried out with time difference in order by area. Therefore, audio processing system 5 can shorten the time required for the abnormality test, and improve the test efficiency.

Furthermore, by dividing band and delay time of the audio signal to be handled for each area, audio processing system 5 can separately recognize the audio for each area even though the audio of the abnormality test target leaks from the adjacent area to the microphone. Therefore, audio processing system 5 can recognize the audio of own area by excluding the audio of other areas. Audio processing system 5 can suppress the deterioration of accuracy of the abnormality test even when the abnormality test is carried out at the plurality of areas simultaneously (at once).

[Effects and the Like]

In audio processing system 5 of the present embodiment, when detecting the abnormality using the audio, for example, speaker sp1 outputs audio. The plurality of microphones mc1 to mc3 collect the audio. The plurality of BPFs 21 to 23 allow the audio signals of the audio collected by the plurality of microphones mc1 to mc3 to pass any respective band included in 0 to band 3 kHz of the audio output from speaker sp1. The plurality of delayers 31 to 33 delay the audio signals passed through the plurality of BPFs 21 to 23 by the delay time corresponding to each bands of 10 msec, 20 msec, and 30 msec. Correlation value calculator 15 calculates the correlation value of the plurality of audio signals respectively delayed by the plurality of delayers 31 to 33 and the audio signal of the audio output from speaker sp11. Abnormality determinator 17 determines presence or absence of abnormality in the plurality of microphones mc1 to mc3 and speaker sp1 based on the calculated correlation value.

Microphones mc1 to mc3 are an example of a microphone. BPFs 21 to 23 are an example of a first filter. Delayers 31 to 33 are an example of a first delayer. Abnormality determinator 17 is an example of a determinator. Each band of 0 to 1 kHz, 1 to 2 kHz. and 2 to 3 kHz is an example of a first band.

Since audio processing system 5 delays the audio signal input into the microphone for each microphone, the correlation value peak appears at different time positions for each microphone. Therefore, the time position where the correlation value peak appears indicates whether there is abnormality in the speaker or the plurality of microphones of the abnormality test target.

Audio processing system 5 can determine which one of the speaker or the plurality of microphones of the abnormality test target is abnormal by using the correlation value at the time corresponding to the delay times of each of delayers 31 to 33 even in a case where some of the correlation value is not detected.

Audio processing system 5 can carry out the abnormality test at once with respect to the plurality of microphones even though there are a plurality of microphones of the abnormality test target, improve the test efficiency, and shorten the time required for the abnormality test. Therefore, audio processing system 5 can shorten the time required for, for example, maintenance and pre-flight preparation of an aircraft.

Since audio processing system 5 is used in the ANC system, it can be said that it is also a noise cancellation system. In audio processing system 5, since audio processing device 10 diagnoses presence or absence of abnormality in the microphones and the speakers included in audio processing system 5, it can be said that the audio processing device 10 has the self-diagnosis function related to the abnormality test.

The bands of the plurality of BPFs 21 to 23 may be different bands 0 to 1 kHz, 1 to 2 kHz and 2 to 3 kHz, respectively.

Compared to a case where bands of the plurality of BPFs 21 to 23 overlap, the correlation value at the time position other than the correlation peak becomes small. The difference in correlation value at the time position of the correlation value peak and the time position other than peak of the correlation value increases. Therefore, audio processing system 5 can improve the determination accuracy of the presence or absence of abnormality. When the bands of audio signals of each microphone are different, since the band of the test target corresponding to one microphone is narrowed, audio processing system 5 can reduce the processing load related to the abnormality determination.

Audio processing system 5 may include monitor 50 that displays information on the presence or absence of the abnormality of at least one of the plurality of microphones mc1 to mc3 and speaker sp1 determined by abnormality determinator 17. Monitor 50 is an example of display.

A user can visually recognize the presence or absence of abnormality in the microphones and speakers.

Speaker sp1 may output audio of a predetermined band. BPFs 21 to 23 may allow the audio signal of the band included in the predetermined band to pass.

Audio processing system 5 can determine the presence or absence of abnormality by collecting the audio of any band with respect to each of microphones mc1 to mc6. Therefore, audio processing system 5 can suppress the noise emitted from the target to be muffled.

The predetermined band may be a band including 0 to 1 kHz.

Audio processing system 5 can collect the audio of the band including 0 to 1 kHz which is the band of the engine sound, and can determine the presence or absence of abnormality with respect to each of microphones mc1 to mc6. It is possible to appropriately carry out the abnormality test of the plurality of microphones and speakers used in the ANC system such as an aircraft. Audio processing system 5 can output audio of an opposite phase from a speaker with respect to the engine sound of an aircraft, and suppress the engine sound around the user.

Audio processing system 5 may include a plurality of BPFs 27 and 28 that allow the audio signal of 0 to 3 kHz and 3 to 6 kHz (plurality of different bands) to pass. Speakers sp1 and sp2 may input the audio signal passed through BPFs 27 and 28 respectively and output audio based on the audio signal. Microphones mc1 to 3 which are part of the plurality of microphones mc1 to mc6 and speaker sp1 which is a part of the plurality of speakers sp1 and sp2 may be combined to form a first group. Similarly, microphones mc4 to 6 which are a part of the plurality of microphones mc1 to mc6 and speaker sp2 which is a part of the plurality of speakers sp1 and sp2 may be combined to form a second group. Bands 0 to 1 kHz, 1 to 2 kHz, and 2 to 3 kHz of BPFs 21 to 23 corresponding to microphones mc1 to mc3 belonging to the first group may be included in the band 0 to 3 kHz of BPF 27 corresponding to speaker sp1 belonging to the first group. Bands 3 to 4 kHz, 4 to 5 kHz, and 5 to 6 kHz of BPFs 24 to 26 corresponding to microphones mc4 to mc6 belonging to the second group may be included in the band 4 to 6 kHz of BPF 28 corresponding to speaker sp2 belonging to the second group.

BPFs 27 and 28 are an example of a second filter. Speaker sp1 is an example of a first speaker. Speaker sp2 is an example of a second speaker.

In audio processing system 5, even when the plurality of speakers sp1 and sp2 output the audio for the abnormality test simultaneously, it is possible to input and detect each audio input by microphones mc1 to mc3 and mc4 to mc6 and BPFs 21 to 23 and 24 to 26 by separating the output band of the audio for the abnormality test. Audio processing system 5 can carry out the abnormality test of the plurality of speakers and the plurality of microphones at once even when the plurality of speakers make sound simultaneously. Accordingly, audio processing system 5 can improve the test accuracy of the abnormality test and promptly carry out the abnormality test.

Audio processing system 5 may include control device 40 that sets parameters of audio processing device 10. In a case where the correlation value calculated by correlation value calculator 15 is less than threshold value th1 at the time corresponding to each delay time of 10 msec, 20 msec, and 30 msec delayed by delayers 31 to 33, control device 40 may switch and set band 0 to 3 kHz of BPF 27 corresponding to speaker sp1 belonging to the first group and band 3 to 6 kHz of BPF 28 corresponding to speaker sp2 belonging to the second group.

In a case where the correlation value of the plurality of delayed audio signals collected by a plurality of microphones mc1 to mc3 and the audio signal of audio output from speaker sp1 is less than threshold value th1 at each time and the correlation value cannot be obtained, audio processing system 5 switches information on the band of BPF 27 and information on the band of BPF 28. Microphones mc1 to mc3 input the audio output from speaker sp2 and the abnormality test is carried out again, so that audio processing system 5 can determine whether speaker sp1 is abnormal or all of the plurality of microphones mc1 to mc3 are abnormal. In a case where a plurality of speakers are provided, audio processing system 5 can determine the abnormality even when there is abnormality in some of speakers.

The first group may include speaker sp1 and a plurality of microphones mc1, mc2, and mc5 disposed within a predetermined distance from speaker sp1. The second group may include speaker sp2 and a plurality of microphones mc3, mc4, and mc6 disposed within a predetermined distance from speaker sp2. That is, a group of abnormality test target may be formed by combining these groups.

In audio processing system 5, since microphones mc1, mc2, and mc5 collect audio emitted from speaker sp1 existing in a short distance and the abnormality test is carried out, it is easy to collect the audio emitted from speaker sp1. Audio processing system 5 can easily determine the peak of the correlation value and improve the accuracy of the abnormality test.

Audio processing system 5 may include a plurality of microphones, a speaker, and audio processing device 10 in a plurality of areas including first area are1 and second area are2. At least one group including a plurality of microphones and a speaker may be formed in each area. Control device 40 may set a band 0 to 6 kHz of BPFs 21 to 26 corresponding to microphones mc1 to mc6 provided in first area are1 and a band 0 to 6 kHz of BPFs 27 and 28 corresponding to speakers sp1 and sp2 provided in first area are1 as a band included in a predetermined band (0 to 6 kHz, for example). Control device 40 may set a band 6 to 12 kHz of BPFs 121 to 126 corresponding to microphones mc11 to mc16 provided in second area are2 and a band 6 to 12 kHz of BPFs 127 and 128 corresponding to speakers sp11 and sp12 provided in second area are2 as a band included in a predetermined band (6 to 12 kHz, for example) different from the predetermined band.

Since the band is divided for each area, audio processing system 5 can, for example, recognize the audio emitted by a speaker of another area even if the abnormality test for the plurality of microphones and speakers used in the ANC for each adjacent area is carried out simultaneously. That is, audio processing system 5 can determine the abnormality by excluding the audio signal emitted by a speaker of other areas among the audio signals input by the microphone in the areas.

Audio processing device 10 related to second area are2 may include delayers 137 and 138 that delay the audio signal input into speakers sp11 and sp12 provided in second area are2. Delayers 137 and 138 are an example of a second delayer.

Since the delay time is divided for each area, audio processing system 5 can, for example, recognize the audio emitted by a speaker of another area even if the abnormality test of the plurality of microphones and speakers used in the ANC for each adjacent area is carried out simultaneously. That is, audio processing system 5 can determine the abnormality by excluding the audio signal emitted by a speaker of other areas among the audio signals input by the microphone in the areas. The audio signals output from speakers sp1 and sp2 in first area are1 may be delayed using a delayer, and may not be delayed.

Although the embodiments have been described with reference to the drawings, it is needless to say that the present disclosure is not limited to such examples. It will be apparent to those skilled in the art that various modifications or modifications can be conceived within the scope described in the claims, and it should be understood that they naturally belong to the technical scope of the present disclosure.

In the above-described embodiment, it is exemplified that passbands of BPFs 21 to 26 are different to each other in audio processing system 5, but it is not limited to this. That is, the passbands of BPFs 21 to 26 may be any band included in the band of the audio output from speaker sp1 or speaker sp2. For example, all of the passbands of BPF 21 to BPF 23 may be 0 to 3 kHz which is the same as the passband of speaker sp1. The passbands of BPF 21 to BPF 22 may be set to 0 to 2 kHz and 1 to 3 kHz, each partially overlapping.

For example, even when the passbands of BPFs 21 to 23 are optional, since time positions of the correlation value of the audio signals input by microphones mc1 to mc3 are different by delayers 31 to 33, audio processing system 5 can determine the abnormality using the correlation value.

For example, in a case where the passbands of BPFs 21 to 23 are different, since the audio signals input by microphones mc1 to mc3 are delayed for each band, the correlation value peak appears at different time positions for each band in audio processing system 5. In a case where the audio signals relatively delayed by delayers 31 to 33 are added, the level of added audio signal becomes relatively small at the time positions other than the correlation value peak (see FIG. 4A. The difference of the correlation value at the time position (10 ms, 20 ms, 30 ms, for example) of the correlation value peak and the time position (time position other than 10 ms, 20 ms, 30 ms, for example) other than the correlation value peak increases. Therefore, audio processing system 5 can improve the determination accuracy of the presence or absence of abnormality. By making the band of the audio signal of each microphone different, the band of the test target corresponding to a single microphone is narrowed, and audio processing system 5 can reduce the processing load related to the abnormality determination.

In the above-described embodiment, it is exemplified that the abnormality test is carried out for six microphones (four reference microphones and two error microphones) and two speakers used in audio processing system 5 as the ANC system. The number of microphones and speakers is not limited to this, and any combination can be used.

In the above-described embodiment, it is exemplified that in a case of using two speakers and six microphones, audio processing system 5 forms a group by combining one speaker and three microphones, and performs an abnormality test. Audio processing system 5 may perform the abnormality test for all microphones (six) with one speaker. Three or more groups of abnormality test target may be formed.

In the above-described embodiment, it is exemplified that the microphone and the speaker of audio processing system 5 are installed in an aircraft, but it may be installed in vehicles (automobile, ship, rocket and alike) other than the aircraft.

In the above-described embodiment, it is exemplified that the reference microphone and the error microphone are included in audio processing system 5, but either one may be omitted. For example, in feedback type ANC, reference microphone can be omitted.

In the above-described embodiment, it is exemplified that white noise is input into BPFs 27 and 28 as outputs for speakers sp1 and sp2, but the audio data other than white noise may be input. For example, the audio data with a predetermined audio band may be input into BPFs 27 and 28 instead of the audio data with no defined band such as white noise. The audio data with the predetermined band may be a band wider than the band (0 to 6 kHz, for example) in which the abnormality test for the microphone and the speaker is carried out.

In the above-described embodiment, it is exemplified that one area is one seat area, but one area may include two or more seat areas.

In the above-described embodiment, it is exemplified that the abnormality test for speakers and microphones is carried out during the maintenance or pre-flight preparation when the aircraft is parked, but the abnormality test may be carried out during aircraft flight. In this case, audio processing system 5 may avoid the band (500 Hz to 1 kHz, for example) of the engine sound and may output an audio signal from the speaker. It is because the engine sound always presents during the flight. The processing load of audio processing device 10 related to the abnormality test is reduced.

In the above-described embodiment, the processor may be physically configured in any way. With a programmable processor, processing contents can be changed by program change, and it is possible to increase the design flexibility of the processor. The processor may be configured of a single semiconductor chip, and may be physically configured of a plurality of semiconductor chips. In the case of the plurality of semiconductor chips, each control in the first embodiment may be realized by separate semiconductor chips. In this case, it can be considered that a single processor is composed of those plurality of semiconductor chips. The processor may be configured of a member (such as capacitor) having a function different from that of the semiconductor chip. A single semiconductor chip may be configured so as to realize the functions of the processor and other functions.

INDUSTRIAL APPLICABILITY

The present disclosure is useful for an audio processing system, an audio processing device, and an audio processing method that can shorten the time required for the abnormality test of a speaker and a microphone and determine presence or absence of abnormality even in a case where there are a plurality of microphones and speakers in a vehicle.

REFERENCE MARKS IN THE DRAWINGS

5 AUDIO PROCESSING SYSTEM
10 AUDIO PROCESSING DEVICE
11 CPU
12 MEMORY
13, 14 ADDER
15, 16 CORRELATION VALUE CALCULATOR
17, 18 ABNORMALITY DETERMINATOR
20 CONTROLLER
21 to 28, 121 to 128, 127*a*, 128*a* BPF
31 to 36, 137, 138 DELAYER
40 CONTROL DEVICE
50 MONITOR
71 SEAT
75 PARTITION
111 FIRST SECTION
112 SECOND SECTION
are1 FIRST AREA
are2 SECOND AREA
c1 to c6 A/D CONVERTER
e1, e2 D/A CONVERTER
hm PASSENGER
mc1 to mc6, mc11 to mc16 MICROPHONE
Ra REGION
sp1, sp2, sp11, sp12 SPEAKER

The invention claimed is:

1. An audio processing system comprising:
a speaker that outputs audio;
a plurality of microphones that collect the audio; and
an audio processing device that determines presence or absence of abnormality in the plurality of microphones and the speaker based on the audio collected by the microphones,
wherein the audio processing device includes,
a plurality of first filters that allow audio signals of audio collected by the plurality of microphones to pass any respective first bands included in a band of the audio output from the speaker,
a plurality of first delayers that delay the audio signals passed through the plurality of first filters by delay times corresponding to the first bands respectively,
a correlation value calculator that calculates a correlation value of a plurality of audio signals delayed respectively by the plurality of first delayers and an audio signal of the audio output from the speaker, and
a determinator that determines presence or absence of abnormality in the plurality of microphones and the speaker based on the correlation value.

2. The audio processing system of claim 1,
wherein bands of the plurality of first filters are different from each other.

3. The audio processing system of claim 2, further comprising:
a display that displays information on presence or absence of abnormality in at least one of the plurality of microphones and the speaker determined by the determinator.

4. The audio processing system of claim 2,
wherein the speaker outputs audio of a predetermined band, and
wherein the plurality of first filters allow the audio signals of the first bands included in the predetermined band to pass.

5. The audio processing system of claim 4,
wherein the predetermined band includes a band of 0 to 1 kHz.

6. The audio processing system of claim 2, further comprising:
a plurality of second filters that allow audio signals of a plurality of different second bands to pass,
wherein the speaker includes a plurality of speakers,
wherein the plurality of speakers input audio signals respectively passed through the plurality of second filters, and output audio of the audio signals,
wherein each part of the plurality of microphones and each part of the plurality of speakers are combined to form a group including a first group and a second group,
wherein the first band of the first filter corresponding to a microphone belonging to the first group is included in the second band of the second filter corresponding to a first speaker belonging to the first group, and
wherein the first band of the first filter corresponding to a microphone belonging to the second group is included in the second band of the second filter corresponding to a second speaker belonging to the second group.

7. The audio processing system of claim 6,
wherein the first group includes the first speaker and the plurality of microphones disposed within a predetermined distance from the first speaker, and
wherein the second group includes the second speaker and the plurality of microphones disposed within a predetermined distance from the second speaker.

8. The audio processing system of claim 6, further comprising:
a control device that sets parameters of the audio processing device,
wherein the plurality of microphones, the speaker and the audio processing device are provided in each of a plurality of areas including a first area and a second area,
wherein at least one group including the plurality of microphones and the speakers is formed for each of the areas, wherein the control device sets the first band of the first filter corresponding to the microphones provided in the first area and the second band of the second filter corresponding to the speaker provided in the first area as a band included in a predetermined third band, and wherein the control device sets the first band of the first filter corresponding to the microphones provided in the second area and the second band of the second filter corresponding to the speaker provided in the second area as a band included in a predetermined fourth band different from the third band.

9. The audio processing system of claim 6, further comprising:

a control device that sets parameters of the audio processing device, wherein the plurality of microphones, the speaker and the audio processing device are provided in each of a plurality of areas including a first area and a second area, wherein at least one group including the plurality of microphones and the speaker is formed for each of the areas, and wherein the audio processing device related to the second area includes a second delayer that delays an audio signal to be input to the speaker provided in the second area.

10. The audio processing system of claim 6, further comprising:

a control device that sets parameters of the audio processing device, wherein the control device, in a case where a correlation value calculated by the correlation value calculator is less than a threshold value at a time corresponding to each of the delay times delayed by the first delayer, switches and sets the second band of the second filter corresponding to the first speaker belonging to the first group and the second band of the second filter corresponding to the second speaker belonging to the second group.

11. The audio processing system of claim 10, further comprising:

a control device that sets parameters of the audio processing device, wherein the plurality of microphones, the speaker and the audio processing device are provided in each of a plurality of areas including a first area and a second area, wherein at least one group including the plurality of microphones and the speaker is formed for each of the areas, and wherein the control device sets the first band of the first filter corresponding to the microphones provided in the first area and the second band of the second filter corresponding to the speaker provided in the first area as a band included in a predetermined third band, and wherein the control device sets the first band of the first filter corresponding to the microphones provided in the second area and the second band of the second filter corresponding to the speaker provided in the second area as a band included in a predetermined fourth band different from the third band.

12. The audio processing system of claim 10, further comprising:

a control device that sets parameters of the audio processing device, wherein the plurality of microphones, the speaker and the audio processing device are provided in each of a plurality of areas including a first area and a second area, wherein at least one group including the plurality of microphones and the speaker is formed for each of the areas, and wherein the audio processing device related to the second area includes a second delayer that delays an audio signal to be input to the speaker provided in the second area.

13. The audio processing system of claim 10, wherein the first group includes the first speaker and the plurality of microphones disposed within a predetermined distance from the first speaker, and wherein the second group includes the second speaker and the plurality of microphones disposed within a predetermined distance from the second speaker.

14. The audio processing system of claim 13, further comprising:

a control device that sets parameters of the audio processing device, wherein the plurality of microphones, the speaker and the audio processing device are provided in each of a plurality of areas including a first area and a second area, wherein at least one group including the plurality of microphones and the speaker is formed for each of the areas, wherein the control device sets the first band of the first filter corresponding to the microphones provided in the first area and the second band of the second filter corresponding to the speaker provided in the first area as a band included in a predetermined third band, and wherein the control device sets the first band of the first filter corresponding to the microphones provided in the second area and the second band of the second filter corresponding to the speaker provided in the second area as a band included in a predetermined fourth band different from the third band.

15. The audio processing system of claim 13, further comprising:

a control device that sets parameters of the audio processing device, wherein the plurality of microphones, the speaker and the audio processing device are provided in each of a plurality of areas including a first area and a second area, wherein at least one group including the plurality of microphones and the speaker is formed for each of the areas, and wherein the audio processing device related to the second area includes a second delayer that delays an audio signal to be input to the speaker provided in the second area.

16. An audio processing device that determines presence or absence of abnormality in a speaker that outputs audio and a plurality of microphones that collects the audio, the device comprising:

a plurality of filters that allow audio signals of audio collected by the plurality of microphones to pass any respective first bands included in a band of the audio output from the speaker;

a plurality of delayers that delay the audio signals passed through the plurality of filters by delay times corresponding to the first bands respectively;

a correlation value calculator that calculates a correlation value of a plurality of audio signals delayed respectively by the plurality of delayers and an audio signal of the audio output from the speaker; and a determinator that determines presence or absence of abnormality in the plurality of microphones and the speaker based on the correlation value.

17. An audio processing method that determines presence or absence of abnormality in a speaker that outputs audio and a plurality of microphones that collects the audio, the method comprising:

allowing audio signals of audio collected by the plurality of microphones to pass any respective first bands included in a band of the audio output from the speaker;

delaying the audio signals passed through any respective first bands by delay times corresponding to the first bands respectively;

calculating a correlation value of a plurality of delayed audio signals and an audio signal of the audio output from the speaker; and determining presence or absence of abnormality in the plurality of microphones and the speaker based on the correlation value.

* * * * *